United States Patent [19]

Ermold et al.

[11] Patent Number: 4,765,374
[45] Date of Patent: Aug. 23, 1988

[54] MULTI-SEAL MECHANICAL TUBE PLUG

[75] Inventors: Leonard F. Ermold, Murrysville; Robert F. Keating; Lawrence A. Nelson, both of Penn Township, Westmoreland County, all of Pa.

[73] Assignee: Westinghouse Electric Corp., Pittsburgh, Pa.

[21] Appl. No.: 110,806

[22] Filed: Oct. 21, 1987

Related U.S. Application Data

[62] Division of Ser. No. 868,225, May 28, 1986.

[51] Int. Cl.⁴ .............................................. F16L 55/12
[52] U.S. Cl. ......................................... 138/89; 165/76
[58] Field of Search ...................... 138/89, 90; 165/71, 165/76; 411/44, 54, 69, 71, 72, 32, 33; 376/203, 451; 220/233, 234, 237

[56] References Cited

U.S. PATENT DOCUMENTS

| | | | |
|---|---|---|---|
| 1,470,767 | 10/1923 | Schaper | 138/89 X |
| 4,235,013 | 11/1980 | Vollmer | 138/89 |
| 4,366,617 | 1/1983 | Nanstiel . | |
| 4,369,662 | 1/1983 | Rieben et al. . | |
| 4,390,042 | 6/1983 | Kucherer et al. | 138/89 |
| 4,415,005 | 11/1983 | Janzen | 138/89 |
| 4,425,944 | 1/1984 | Heuckelbach et al. | 138/89 |
| 4,436,117 | 3/1984 | Martin | 138/89 |
| 4,502,511 | 3/1985 | Zafred | 138/89 |
| 4,598,738 | 7/1986 | Weber et al. | 138/89 |
| 4,653,540 | 3/1987 | Epstein | 138/89 |

Primary Examiner—James E. Bryant, III
Attorney, Agent, or Firm—Donald M. Satina

[57] ABSTRACT

The multi-seal tube plug comprises a substantially cylindrical sheath closed at one end and having a central cavity. An expander is received within the central cavity of the sheath and acts to expand the sheath into contact with the tube. The expander comprises a plurality of radially expandable disks having a central aperture and an expander member adapted to be received within the aperture and to expand the disks. The expanded disks expand a portion of the sheath into contact with the tube to sealingly engage the tube. The expander member is preferably conical and interacts with the conical inner surfaces of the disks. An alternate embodiment of the multi-seal tube plug uses conical washers rather than radially expandable flat disks. All embodiments of the multi-seal tube plug are easily removable and do not damage the tube.

10 Claims, 3 Drawing Sheets

MULTI-SEAL MECHANICAL TUBE PLUG

This is a division of application Ser. No. 06/868,225 filed May 28, 1986.

CROSS-REFERENCE TO RELATED APPLICATIONS

This invention is related to copending U.S. patent application Ser. No. 868,226 filed May 28, 1986, in the name of Sinha et al. and entitled "Duplex Mechanical Tube Plug."

BACKGROUND OF THE INVENTION

1. Field of the Invention

This invention relates to tube plugs and more particularly to apparatus for plugging heat exchanger tubes.

In tube-type heat exchangers, a first fluid flows through the tubes of the heat exchanger while a second fluid surrounds the outside of the tubes such that heat exchange occurs between the two fluids. Degradation of some of the tubes may occur such that a leak either is impending or occurs therein which allows the two fluids to mingle. When this occurs it is sometimes necessary to plug the tubes so that the fluid does not flow through the tubes, thereby preventing leakage from the tubes.

In nuclear reactor power plants, the tube-type heat exchangers are commonly referred to as steam generators. If degradation occurs in the tubes of a nuclear steam generator to such an extent that the coolant in the tubes is allowed to mingle with the coolant outside of the tubes, a more significant problem arises. Since the fluid flowing in the tubes of a nuclear steam generator is generally radioactive, it is important that it not be allowed to leak from the tubes and contaminate the surrounding fluid. Therefore, when degradation beyond the permissible limit occurs in a nuclear steam generator heat exchanger tube, the tube is plugged so that the coolant is not permitted to flow through the tube. This prevents potential contamination of the fluid surrounding the tubes.

There are several kinds of plugs that may be used to plug the heat exchanger tubes. One such device used to plug heat exchanger tubes in nuclear steam generators is an explosive plugging device. With the explosive plugging devices, a metal plug containing an explosive charge is inserted into the heat exchanger tube. When the explosive is detonated, the plug is forced into close contact with the inside of the tube, thus blocking fluid flow through the tube. One problem associated with explosive plugging is that should it become necessary to remove the defective tube or the plug, the plug must be removed by time-consuming machining methods, which result in undesirable radioactive exposure and high cost.

There are also several kinds of plugs that can be used to plug heat exchanger tubes which do not use explosives. One such tube plug is described in U.S. Pat. No. 4,502,511 issued Mar. 5, 1985 in the name of Zafred, assigned to the Westinghouse Electric Corporation, and entitled "Tube Plug". The substantially cylindrical shell of this tube plug is expanded into contact with the inside surface of the tube, preferably by a conventional roller expander. The expander is then removed.

Other mechanical plugs are useful for plugging the heat exchanger tubes of nuclear steam generators. One such mechanical plug is described in U.S. Pat. No. 4,390,042 issued June 28, 1983 in the name of Kucherer et al., assigned to the Westinghouse Electric Corporation, and entitled "Tube Plug". The shell of this plug has a tapered inner surface against which an externally tapered expander member moves by the application of a pulling force and the motion of the expander member relative to the shell causes the shell to expand into contact with the tube. The expander has a self-locking trailing edge to prevent inadvertent unlocking of the plug. A plurality of lands, which are formed on the outside of the shell, are impressed in the wall of the heat exchange tube, causing the plug to be locked, thereby establishing a type of labyrinth seal along the inner surface of the heat exchange tube.

Installation of this type of mechanical plug may be accomplished using a plug installation apparatus such as the apparatus described in U.S. Pat. No. 4,369,662 issued Jan. 25, 1983 in the name of Rieben et al., assigned to the Westinghouse Electric Corporation, and entitled "Plug Installation Apparatus". A rod or drawbar of this apparatus captures the expander member of the plug and a force, preferably provided hydraulically, urges the drawbar downward, axially moving the expander member with respect to the shell and causing the shell to expand into contact with the inner surface of the heat exchange tube. The installation apparatus is then removed, leaving the plug within the tube.

If removal of this type is required, the preferred removal apparatus is described in U.S. Pat. No. 4,366,617 issued Jan. 4, 1983 in the name of Nansteil et al., assigned to the Westinghouse Electric Corporation and entitled "Plug Removal Apparatus". A rod holds the shell of the plug while a ram pushes the expander member relative to the plug to relieve the pressure on the plug. An activating cylinder can then be used to extract the plug from the tube by pulling.

Pushing the expander into the larger portion of the plug may not loosen the plug from tight contact with the internal surface of the tube. Subsequent plug removal by pulling may result in marking of the tube wall. What is needed is a new mechanical tube plug that is capable of being quickly and easily installed in a heat exchange tube and which can be easily removed therefrom while causing a minimum amount of marking of the tube wall.

SUMMARY OF THE INVENTION

The invention is a multi-seal tube plug for preventing flow through tubes. The tube plug has a substantially cylindrical sheath with one closed end, a cylindrical section, a central cavity, and an open end in communication with the cavity. The tube plug also has an expander adapted to be received within the cavity of the sheath and to expand a portion of the cylindrical section of the sheath into contact with the tube to create a seal therebetween. The expander comprises a plurality of radially expandable disks and an expander member. Each disk has a central aperture, an inner surface, and a peripheral surface. The expander member is adapted to expand the disks from within the central aperture to urge the peripheral surface of each expanded disk into contact with the inner wall of the cylindrical section of the sheath and to expand a portion of the sheath into contact with the tube to sealingly engage the tube.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

Due to the degradations that sometimes occur in heat exchanger tubes, it is occasionally necessary to plug the heat exchanger tube. The invention described herein provides a mechanical tube plug for effectively plugging a tube in the heat exchanger and thus preventing circulation of a fluid through the heat exchange tube.

Figure 1:
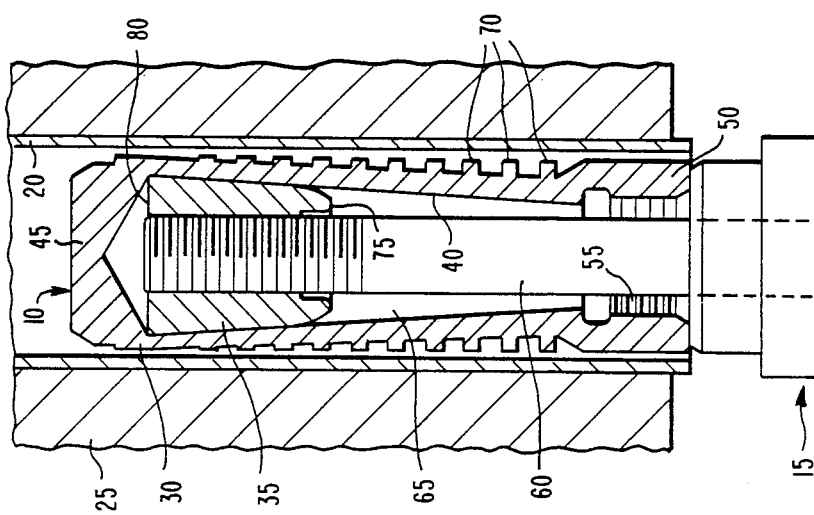
FIG. 1 is a cross-sectional view in elevation of a prior art tube plug positioned within a heat exchange tube to be plugged and attached to a plug installation apparatus.

Referring to FIG. 1, there is shown a prior art tube plug 10 for plugging heat exchanger tubes as described in U.S. Pat. No. 4,390,042 issued June 28, 1983 in the name of Kucherer et al., assigned to the Westinghouse Electric Corporation, and entitled "Tube Plug". This tube plug 10 is shown attached to tube plug installation apparatus 15 positioned within tube 20 near the bottom of tube-sheet 25. Tube plug 10 comprises a shell 30 and an expander member 35. Shell 30 may be a substantially cylindrical member manufactured from a corrosion resistant metal such as Inconel. Shell 30 has a conical inner surface 40 which has a larger diameter at the closed end 45 and a smaller diameter at the open end 50. Inner surface 40 is arranged such that expander member 35 is captured within shell 30 so that movement of expander member 35 relative to inner surface 40 causes shell 30 to expand without allowing expander member 35 to be removed from shell 30. Shell 30 also has a threaded bore 55 near open end 50 which allows the drawbar 60 of installation apparatus 15 to be inserted through threaded bore 55 and into the interior 65 of shell 30. Shell 30 also has a substantially uniform wall thickness in the portion of shell 30 that is expanded by expander member 35. In addition, a plurality of lands 70 are formed on the outside surface of shell 30 in a manner such that the height of each land 70 increases from closed end 45 to open end 50 while the outer surfaces of all lands 70 are maintained at approximately the same external diameter and while the wall thickness of shell 30 remains substantially constant throughout the portion of shell 30 where lands 70 are located. Expander member 35 may be manufactured from a hardenable metal, such as stainless steel alloy Carpenter 455, and is preferably formed such that it has a leading edge 75 which has a tangentially blended radius that minimizes plowing or pushing metal ahead of expander member 35 when expander member 35 is pulled through shell 30 by drawbar 60 of plug installation apparatus 15. Expander member 35 also has a trailing edge 80 which is formed to have a sharp edge such that it provides a self-locking mechanism to restrain expander member 35 from moving toward closed end 45 of shell 30, thereby preventing loosening of plug 10 within tube 20.

Figure 2:
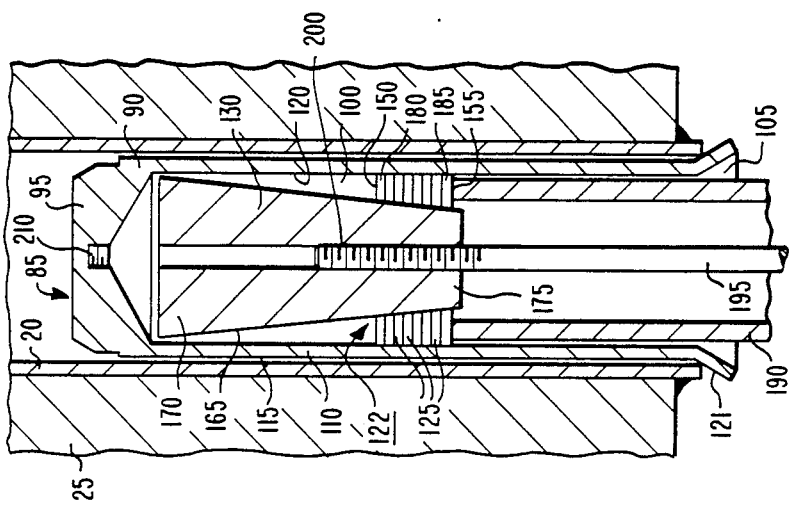
FIG. 2 is a cross-sectional view in elevation of the preferred embodiment of the multi-seal mechanical tube plug as positioned within a heat exchange tube.

Referring now to FIG. 2, there is shown the preferred embodiment of the multi-seal mechanical plug 85 as positioned within a heat exchanger tube 20 near the bottom of tubesheet 25. Tube plug 85 comprises a substantially cylindrical sheath 90 having a closed end 95, a central cavity 100, and an open end 105 in communication with cavity 100. The sheath has a cylindrical section 110 which is attached to the closed end section 95. Sheath 90 may be machined from a piece of bar stock material so that cylindrical section 110 is integral with end 95. Alternatively, cylindrical section 110 maybe a tubular member which is welded to end 95 by conventional means. In either case, the outer surface 115 of cylindrical section 110 is preferably relatively smooth with the preferred surface roughness being that of a machined surface, corresponding to about 32 RMS or 35 AA. A smoother surface would not be detrimental but would be more expensive. Central cavity 100 defines within cylindrical section 110 of sheath 90 an inner surface 120. Sheath 90 is preferably made from a corrosion-resistant material such as Inconel. Open end 105 of sheath 90 is preferably flared or flanged at 121 for engaging tube 20 to pevent over-insertion of plug 85 into tube 20.

Figure 3:
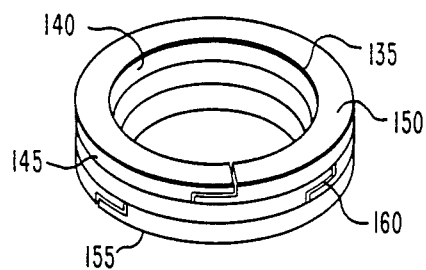
FIG. 3 is an elevational view in perspective of the preferred disks for use with the preferred embodiment of the tube plug.

Disposed within central cavity is an expander 122. In the preferred embodiment illustrated in FIG. 2, expander 122 comprises a plurality of radially expandable disks 125 stacked one upon another and an expander member 130 for radially expanding the disks 125. As illustrated more clearly in FIG. 3, each disk has a central aperture 135, an inner surface 140, an outer or peripheral surface 145, an upper surface 150, and a lower surface 155. While the disks 125 may be radially expandable through various mechanisms, the expansion mechanism illustrated in the preferred embodiment of FIGS. 2 and 3 is that of a substantially radial slit 160. As illustrated most clearly in FIG. 3, the slit preferably extends approximately half way through the thickness of each disk, circumferentially for a relatively short distance, then through the balance of the thickness. In this manner, each disk retains much of its structural rigidity even in the expanded condition.

Figure 4:
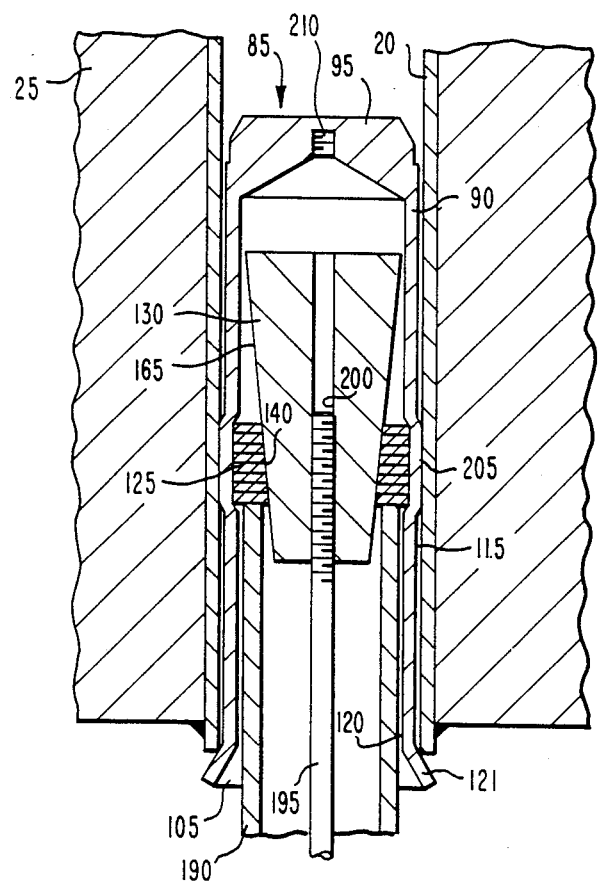
FIG. 4 is a cross-sectional view in elevation of the multi-seal mechanical tube plug in the expanded condition within a heat exchange tube.

While various mechanisms for radially expanding the disks from within the central aperture are feasible, the preferred embodiment as illustrated in FIG. 2, dictates that each disk 125 has a conical inner surface 140 which cooperates with the conical outer surface 165 of expander member 130 to radially expand the disks 125 into contact with the inner wall 120 of cylindrical section 110 of sheath 90 and to expand sheath 90 to place the outer surface 115 thereof into contact with tube 20 to create a seal therebetween as illustrated in FIG. 4. This deformation of a portion of cylindrical section 110 is preferably a plastic deformation.

Expander member 130 is preferably conically inclined to taper from a larger end 170 near closed end 95 sheath 90 to a smaller end 175 nearer open end 105 of sheath 90. However, with suitable modifications, the expander member could taper in the opposite direction. In the preferred embodiment, the disk 180 nearest the closed end 95 of sheath 90 will have the largest central aperture 135 in its upper surface and the disk 185 nearest the open end 105 of sheath 90 will have the smallest aperture in its lower surface 155. A disk retainer 190 is positioned beneath disk 185 nearest open end 105 of sheath 90 to maintain the stack of disks 125 in place while the conical expander member 130 is urged toward open end 105 to expand the disks. Disk retainer 190 is preferably positioned beneath the stack of disks only during expansion of the tube plug and is thereafter removed for use elsewhere.

The angle of taper of the outer surface 165 of expander member 130 must be nearly the same as the angle of taper of the inner surfaces 140 of disks 125 for uniform expansion of the disks. Preferably, the conical inner surfaces 140 of disks 125 are inclined at a half-angle of approximately 3°, and the conical outer surface 165 of expander member 130 is provided with an angle slightly greater than the 3° half-angle of inclination of conical surfaces 140. When the expander member has been drawn toward open end 105 of sheath 90, such as by drawbar 195, as illustrated in FIG. 4, the conical outer surface 165 of expander member 130 cooperates with the conical inner surfaces of disks 125 to lock the expander member 130 together with disks 125 to maintain plug 85 in sealing engagement with the tube 20. Disk retainer 190 and drawbar 195 can then be removed for use in expanding other plugs in tubesheet 25.

Since tube plug 85 is self-locking through cooperation of the outer surface 165 of expander member 130 and the conical inner surfaces 140 of disks 125, expander member 130 and disks 125 must be corrosion-resistant so that oxidation will not result in disengagement of expander member 130 from disks 125, thereby relaxing the radial force exerted upon the cylindrical section 110 of sheath 90 and loosen plug 85. The preferred material for disks 125 and expander member 130 is Inconel. Since the disks 125 must have a higher yield strength than the sheath 90, the disk material is preferably a work hardened Inconel.

For removal of the plug depicted in FIGS. 2 and 4, the drawbar 195 is again threaded into the threaded hole 200 of expander member 130 and the plug removal tool (not shown) grips the bottom of sheath 90 such as by gripping flare or flange 121 at open end 105 or by gripping threads (not shown) in inner wall 120 near the open end 105 of sheath 90. A mechanism, preferably a hydraulic ram, forces drawbar 195 axially toward closed end 95 of sheath 90, thereby forcing expander member 130 away from open end 105. The force provided is preferably sufficient to overcome the resistance offered by engagement of conical outer surface 165 of expander member 130 with conical inner surfaces 140 of disks 125 to axially translate expander member 130 toward closed end 95 of sheath 90. The deformed section 205 of cylindrical section 110 of sheath 90 may spring back sufficiently that outer surface 115 of sheath 90 along deformed section 205 no longer contacts tube 20 or contacts the tube with only slight pressure. If so, plug 85 can be gripped by the flare 121 the open end 105 or by a threaded hole 210 provided in closed end 95 and withdrawn from tube 20. However, if sheath 90 does not spring back sufficiently, TIG (Tungsten Inert Gas) relaxation, wherein a small electrode is passed axially along the inner surface of the sheath to contract the sheath radially, or some other form of radial contraction may be required to remove sheath 90. Since the outer surface 115 is relatively smooth and is at most in only slight engagement with tube 20 when it is removed by pulling from the tube, the walls of the tube should exhibit no marring, scratching or other detrimental effects from the tube having been plugged.

The plug 85 depicted in FIGS. 2 and 4 can be used to plug a tube or can be used to plug a sleeve disposed within the tube and extending to the bottom of the tube-sheet. In either event, the plug works best on an orifice having a diameter near the outer diameter of the cylindrical section 110 of sheath 90 in its unexpanded condition. For plugging ⅞ inch diameter heat exchanger tubes, plug 85 works well within tubes having a diameter of up to about 0.06 inches greater than the diameter of the cylindrical section 110. Sheath 90 of plug 85 is required to expand very little for a tube having a diameter very close to the outer diameter of cylindrical section 110. Therefore, in tubes of this size, expander member 130 will require only limited axial translation. However, as the tube diameter increases with respect to the outer diameter of cylindrical section 110, the expander member will have to be drawn axially farther toward the open end 105 of sheath 90 in order to expand disks 125 sufficiently to expand cylindrical section 110 of sheath 90 into contact with tube 20 with sufficient force to seal the tube.

FIGS. 2 and 4 illustrate the use of eight disks 125. While more or less than eight can be used and spacers may be used between the disks, it is important that sheath 90 is contacted along its inner wall 120 along about 0.200 inch along an axial line through tube plug 85 to ensure that sufficient radial force is exerted to maintain sheath 90 in sealing engagement with tube 20. Lesser or greater contact between sheath 90 and tube 20 could be used to create a leak tight seal.

The force necessary to expand the disks and sheath into contact with tube 20 is dependent upon several factors, with the greatest variation stemming from the differences in tube diameter. For example, a ⅝ inch diameter tube would require a relatively small plug with an installation force on the order 5000 to 7000 pounds, whereas installation of a plug in a larger tube, such as a ⅞ inch diameter tube, would require an installation force of up to 17,000 or 19,000 pounds.

Sheath 90 acts as the plug for tube 20 and constitutes the primary leak path since fluid can pass through slits 160 in disks 125 and into central cavity 100. Therefore, the walls of cylindrical section 110 of sheath 90 must be manufactured to a minimum thickness to withstand the corrosive environment and pressures associated with operation of a steam generator. The preferred thickness of cylindrical section 110 is 0.035 to 0.040 inch. Also, closed end 95 may be manufactured with a threaded hole 210 extending partially through end 95 from cavity 100 to enable gripping of end 95 for removal purposes.

Figure 5:
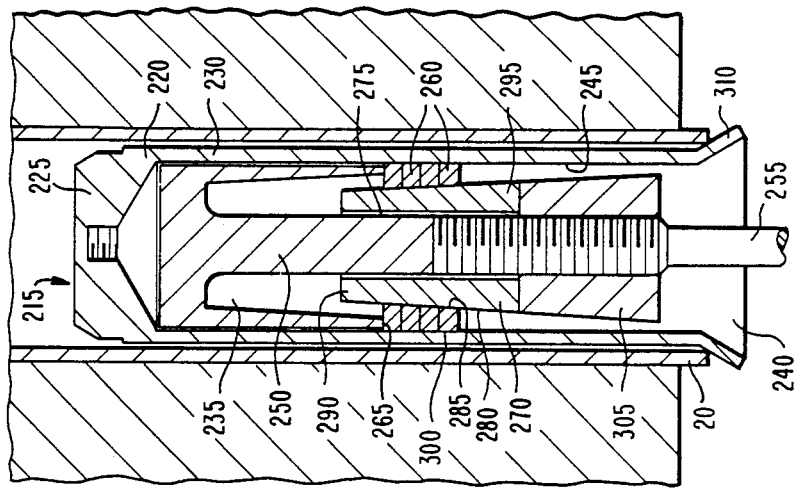
FIG. 5 is a cross-sectional view in elevation of an alternative embodiment of the multi-seal mechanical tube plug as positioned within a heat exchange tube.

FIG. 5 depicts an alternate embodiment 215 of the multi-seal mechanical tube plug. Tube plug 215 comprises a substantially cylindrical sheath 220 having a closed end 225, a substantially cylindrical section 230, a central hollow cavity 235 and an open end 240 in communication with cavity 235. Inner wall 245 defines cavity 235 within sheath 220. Within cavity 235 is positioned a disk retainer 250 having a threaded post 255 and an annular ledge 265. Disks 260 are then positioned against ledge 265 of disk retainer 250. Expander member 270 having a central opening 275 slightly larger than post 255 is positioned about post 255 with its outer surface 280 in contact with the inner surface 285 of disks 260. In a preferred embodiment, inner surfaces 285 of disks 260 are conically inclined and the outer surface 280 of expander member 270 is also conically inclined with expander member 270 having a smaller end 290 nearer to the closed end 225 of sheath 220 and a larger end 295 nearer to the open end 240 of sheath 220. As expander member 270 is axially translated such that the smaller end 290 moves closer to the closed end 225 of sheath 220, the inclined outer surface 280 of expander member 270 contacts the conical inner surfaces 285 of disks 260 and causes disks 260 to expand radially. This radial expansion forces the peripheral surface 300 of disks 260, which have a higher yield strength than the sheath 220, against the inner wall 245 of sheath 220 along a portion of cylindrical section 230 of sheath 220, causing a portion of the cylindrical section 230 to be deformed into contact with tube 20. This deformation is preferably a plastic deformation. Disks 260 are preferably much the same as the disks 125 depicted in FIG. 3 except that the disks 260 in FIG. 5 are disposed with the inner surface tapering in the opposite direction from the disks 125 of the embodiment of FIGS. 2 and 4. The preferred form of the alternate embodiment of FIG. 5 employs an expander nut 305 to urge the expander member 270 toward the closed end 225 of sheath 220 to expand the plug into sealing engagement with the tube. As with the embodiment depicted in FIGS. 2 and 4, the tapers of the outside outer surface 280 of expander member 270 and the inner surfaces 285 of disks 260 cooperate to lock expander member 270 into the expanded position within disks 260. Expander nut 305 may then be removed to prevent loose part problems within the steam generator and the expander member 270 will remain in engagement with the inner surfaces 285 of disks 260.

While more or less than four disks may be used and spacers may be used between the disks, it is important that the sheath 220 is contacted along its inner wall 245 along about 0.200 inch along an axial line through tube plug 215 to ensure that sufficient radial force is exerted to maintain sheath 220 in sealing engagement with tube 20 during operation of the steam generator. More or less contact force could be used to create a leak tight seal.

As described above in reference to FIGS. 2 and 4, sheath 220 is preferably provided with a flared or flanged end 310 adjacent open end 240 to prevent insertion of the plug to an overly great extent within the tube and to assist in future plug removal, if necessary.

Figure 6:
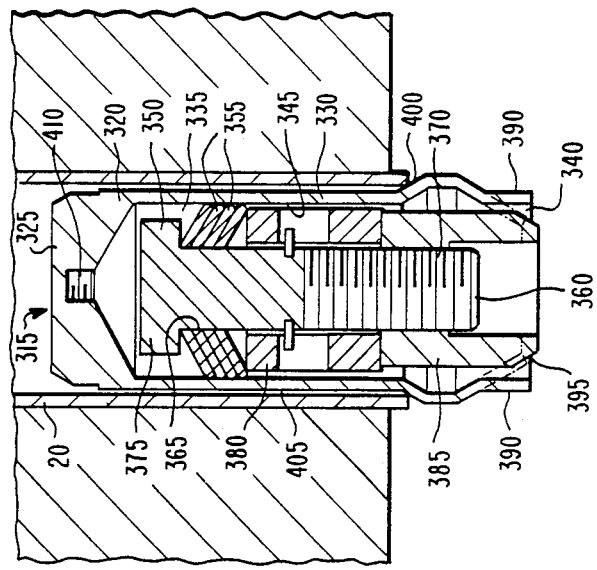
FIG. 6 is a cross-sectional view in elevation of an alternative embodiment of the multi-seal mechanical tube plug as positioned within a heat exchange tube.

FIG. 6 illustrates a further alternative embodiment of the multi-seal mechanical tube plug 315. This embodiment of the tube plug has a sheath 320 having a closed end 325, a cylindrical section 330, a central cavity 335, and an open end 340 in communication with central cavity 335. Inner wall 345 defines cavity 335 within sheath 320. Positioned within central cavity 335 is an expander member 350. Rather than the flat, round disks of the previous two embodiments, which preferably had a slit to enhance the radial expansion capabilities of the disks, this third embodiment employs conical washers 355 of the type which are also known as spring washers or Belleville springs. When conical washers are flattened, they expand radially. Therefore, with conical washers of a diameter slightly less than the inside diameter of cavity 335, flattening of the washers is all that is required to radially expand them into contact with the inner surface 345 of cylindrical section 330 of sheath 320 to expand a portion of cylindrical section 330 into contact with tube 20, creating a seal therebetween.

In order to flatten the spring washers 355, force must be applied to the conical washers from each side. Preferably, as depicted in FIG. 6, expander 350 has a rod 360 which extends through the central apertures 365 of washers 355 and which has a threaded end 370 adjacent the open end 340 of sheath 320. Attached to the end of rod 360 near closed end 325 of sheath 320 is a first ledge 375. This ledge may be fixedly attached as depicted or may take the form of a nut or other solid annular structure. A second ledge 380 is positioned on the opposite side of conical washers 355 from first ledge 375. When the second ledge and the first ledge are urged toward each other with a spring compression device, the conical washers 355 become flattened and expand radially, causing a portion of the cylindrical section 330 of plug 315 to expand into contact with tube 20. As in the previous embodiments, washers 355 are made of a material having a higher yield strength than that of sheath 320. In the embodiment depicted in FIG. 6, an expander nut 385 threads onto threaded section 370 of rod 360 and urges the second ledge 380 toward the first ledge 375 flattening washers 355 and expanding the plug into contact with the tube. Since the embodiment of FIG. 6 contains no self-locking features as provided in the embodiments of FIGS. 2 and 5, the expander nut 385 must remain in the expanded position within plug 315. Therefore, a locking mechanism is required to ensure that expander nut 385 does not become loosened. As depicted in FIG. 6, tabs 390 are deformed into slots 395 in expander nut 385. As with the previous embodiments, a ledge or flare 400 is provided near the bottom of the sheath 320 to prevent plug 315 from being inserted beyond a predetermined depth within tube 20. Also, the outer surface 405 of sheath 320 is preferably smooth so as to prevent damage to the tube wall from plug expansion.

As described for the embodiments of FIGS. 2, 4, and 5, more or less disks than the four illustrated can be used and spacers can be used between the disks. Preferably, the inner wall 345 of sheath 320 is contacted along at least 0.200 inch along a line cut axially through plug 315. However, more or less contact can be used to achieve a leak tight seal.

For removal of the plug illustrated in FIG. 6, tab 390 is straightened out, expander nut 385 is threaded off of threaded section 370 of rod 360, allowing second ledge 380 to move away from first ledge 375. The conical washers then spring back to their position illustrated in FIG. 6 and the expander 350 can be withdrawn from within central cavity 335 of sheath 320. The portion of cylindrical section 330 which was expanded into contact with tube 20 should spring back sufficiently for easy removal of plug 315 from within tube 20. If, however, this portion does not spring back, TIG (Tungsten Inert Gas) relaxation or some other diametral reduction mechanism is employed to loosen sheath 320 from within tube 20. As with the plugs depicted in FIGS. 2 and 5, a threaded sheath removal hole 410 is provided in closed end 325 of sheath 320 for assisting removal of sheath 320 from within plug 20.

Therefore, it can be seen that the invention provides a multi-seal mechanical tube plug capable of being quickly and easily installed in the heat exchange tube of a nuclear steam generator. The tube plug described is leak-tight, easily removable, and precludes any damage to the inner walls of the tube should subsequent removal be necessary.

We claim:

1. A tube plug for plugging a tube to stop flow therethrough, said tube plug comprising:

a sheath having a closed end, a cylindrical section, and an open end, expander means adapted to be received within said sheath for expanding said sheath into contact with the tube, said expander means comprising a plurality of disks, each disk being substantially round, being made of a material having a higher yield strength than that of said sheath, having a peripheral surface, a central aperture, and an inner surface defined by the central aperture, and being conically arched from the peripheral surface to the central aperture, said expander means further comprising an expander member, said expander member being adapted to radially expand said disks, the expansion of each disk causing the peripheral surface of each disk to contact the inner wall of the cylindrical section of said sheath and causing a portion of said sheath to expand into contact with the tube to sealingly engage the tube.

2. The tube plug according to claim 1, wherein said expander member radially expands said disks by flattening said conically arched disks.

3. The tube plug according to claim 2, wherein the expander member comprises a rod adapted to be inserted through the central aperture of each disk, a first ledge means attached to the rod near the closed end of said sheath for engaging a surface of one of the disks near the closed end of said sheath, and a second ledge means attached to the rod near the open end of said sheath for engaging a surface of one of the disks near the open end of said sheath, the plurality of conical radially expandable disks being juxtaposed between the first ledge means and the second ledge means.

4. The tube plug according to claim 3, further comprising a disk compression means for urging the second ledge means nearer to the first ledge means for flattening the conically arched disks to cause the disks to expand radially to expand said sheath into sealing engagement with the tube.

5. The tube plug according to claim 4, wherein the rod is threaded near the open end of said sheath and the disk compression means comprises an expander nut threadable onto the rod and operable to move the second ledge means toward the first ledge means by threaded onto the rod.

6. The tube plug according to claim 5, further comprising locking means for locking the expander nut in place after the plug has been expanded into contact with the tube.

7. A tube plug for plugging a tube to prevent flow therethrough, said tube plug comprising:
a substantially cylindrical sheath having one closed end, a cylindrical section, a central cavity, an inner wall, and an open end in communication with the cavity; and
an expander means adapted to be received within the cavity for expanding a portion of the cylindrical section of said sheath into contact with the tube to create a seal therebetween, said expander means comprising a plurality of radially expandable disks and an expander member;
each disk being substantially round, being made of a material having a higher yield strength than that of said sheath, having a peripheral edge, an inner surface, and a central aperture, and being conically arched from the peripheral edge to the central aperture;
the expander member being adapted to expand the disks and to urge the peripheral edge of each expanded disk into contact with the inner wall of the cylindrical section of said sheath and to expand a portion of said sheath into contact with the tube to sealingly engage the tube.

8. The tube plug according to claim 7, wherein the expander member comprises a rod adapted to pass through the central aperture of each disk, a first ledge means attached to the rod near the closed end of said sheath for engaging a surface of one of the disks near the closed end of said sheath, and a second ledge means attached to the rod near the open end of said sheath for engaging a surface of one of the disks near the open end of said sheath with the plurality of conical disks juxtaposed between the first ledge means and the second ledge means.

9. The tube plug according to claim 8, further comprising a disk compression means for flattening the conical disks by urging the second ledge means and the first ledge means closer together, the flattening of the conical disks acting to radially expand the disks into contact with at least part of the cylindrical section of said sheath and to expand a portion of the cylindrical section of said sheath into sealing engagement with the tube.

10. The tube plug according to claim 9, wherein the rod is threaded near the open end of said sheath and the disk compression means comprises an expander nut which threads onto the rod and contacts the second ledge means when the expander nut is rotated.

* * * * *